United States Patent
Wolfe et al.

(10) Patent No.: US 8,355,541 B2
(45) Date of Patent: Jan. 15, 2013

(54) TEXTURE SENSING

(75) Inventors: Andrew Wolfe, Los Gatos, CA (US);
Thomas Martin Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 803 days.

(21) Appl. No.: 12/502,304

(22) Filed: Jul. 14, 2009

(65) Prior Publication Data
US 2011/0013808 A1  Jan. 20, 2011

(51) Int. Cl.
*G06K 9/00* (2006.01)
(52) U.S. Cl. ........................................................ 382/108
(58) Field of Classification Search .................. 382/108, 382/217, 218, 285, 286, 293; 345/582
See application file for complete search history.

(56) References Cited

U.S. PATENT DOCUMENTS

| | | | |
|---|---|---|---|
| 4,586,038 A * | 4/1986 | Sims et al. | 345/586 |
| 4,853,777 A * | 8/1989 | Hupp | 348/128 |
| 5,511,153 A * | 4/1996 | Azarbayejani et al. | 345/419 |
| 5,544,256 A * | 8/1996 | Brecher et al. | 382/149 |
| 6,078,334 A * | 6/2000 | Hanaoka et al. | 345/584 |
| 6,424,351 B1 * | 7/2002 | Bishop et al. | 345/582 |
| 6,937,939 B1 * | 8/2005 | Shibusawa et al. | 702/22 |
| 2001/0020946 A1 * | 9/2001 | Kawakami et al. | 345/582 |
| 2003/0025788 A1 * | 2/2003 | Beardsley | 348/43 |
| 2003/0038801 A1 * | 2/2003 | Terauchi et al. | 345/420 |
| 2006/0152522 A1 * | 7/2006 | Strassenburg-Kleciak et al. | 345/582 |
| 2006/0233427 A1 * | 10/2006 | Hauke et al. | 382/124 |
| 2008/0158239 A1 * | 7/2008 | Lamy et al. | 345/581 |
| 2009/0256909 A1 * | 10/2009 | Nixon | 348/144 |

* cited by examiner

*Primary Examiner* — Claire X Wang
*Assistant Examiner* — Shervin Nakhjavan
(74) *Attorney, Agent, or Firm* — Dorsey & Whitney LLP

(57) ABSTRACT

A device for modeling a texture is described. An example device may include a plurality of image sensors, a data storage, and a processor operatively associated with the data storage and adapted to execute computer implemented instructions to capture a set of images of a surface with one or more of the plurality of image sensors, analyze the set of captured images to determine one or more surface variables, and convert the analyzed set of captured images into a surface texture type based on the one or more surface variables. A method for modeling a surface texture using a hand-held device is also described.

20 Claims, 5 Drawing Sheets

TEXTURE SENSING

BACKGROUND

Systems for generating 3D models of a surface by scanning or imaging physical objects are known. Such systems are limited to generating the 3D models. However, in some cases, it may be desirable to determine one or more characteristics of the surface such as, for example, surface texture.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In some examples, the present disclosure may relate to systems and methods for three-dimensional modeling of surfaces. More particularly, in an illustrative example, the present disclosure may relate to systems and methods for characterizing a surface texture of a physical object based on a three-dimensional model of the surface. Such processes and methods may, for example, simplify identification of a type of textured surface such as, for example, rough, smooth, bumpy, jagged, slick, scratchy, silky, soft, prickly, and the like.

Figure 1:
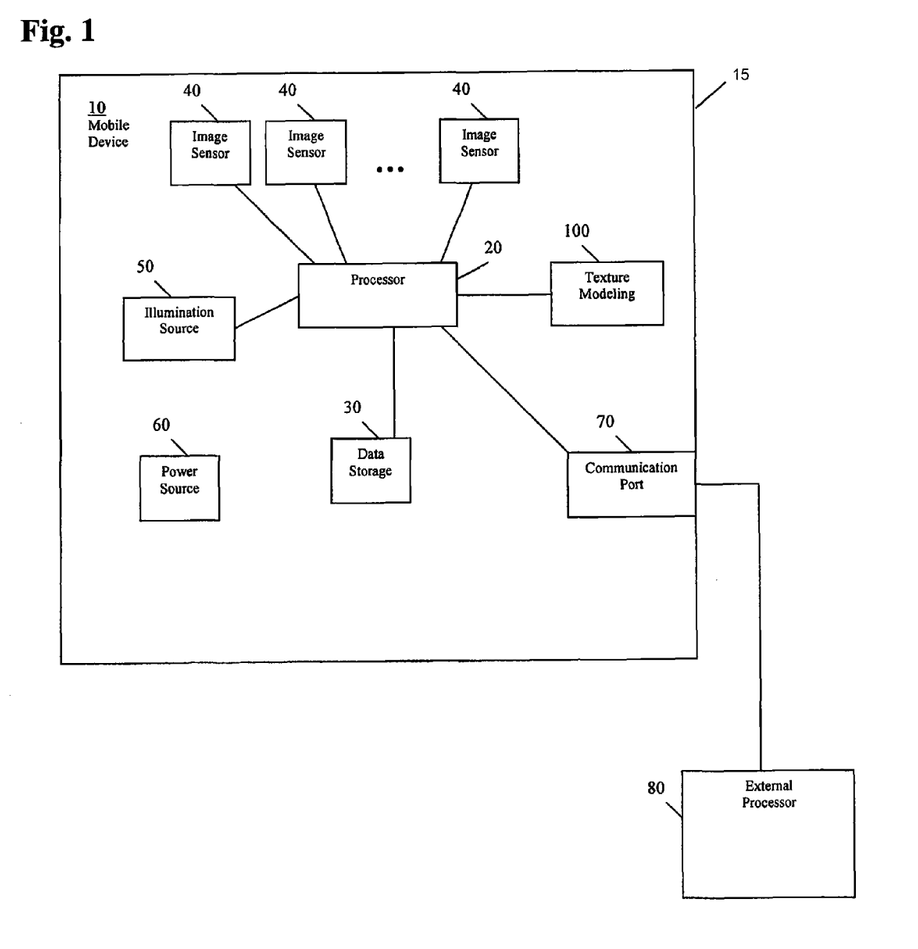
FIG. 1 depicts a block diagram of a mobile device for modeling a surface texture in accordance with some examples of the present disclosure.

FIG. 1 depicts a block diagram of a mobile device 10 for modeling a surface texture in accordance with some examples of the present disclosure. The components of the mobile device 10 may be enclosed or mounted in a housing 15. In some examples, the mobile device 10 may include a processor 20, one or more data storage components 30, a plurality of image sensors 40, one or more illumination source components 50, a power source 60, a communication port 70 for linking with an external processor 80, and a texture modeling system 100, each of which are described in greater detail below.

In one example, housing 15 may be sized and shaped such the mobile device 10 is capable of being held easily in one hand. In other examples, the housing 15 may be ergonomically shaped for a human hand. For example, device housing 15 may be mouse-shaped, wand shaped, or the like.

It can be appreciated that many of the processes implemented in the mobile device 10 may be implemented in or controlled by software operating in a microprocessor, central processing unit (CPU), controller, digital signal processor (DSP) and/or an application specific integrated circuit (ASIC), collectively depicted as block 20 and termed as "processor". In various embodiments, more or fewer components may be included in processor 20.

In some examples, data may be stored in one or more data storage components 30, which may comprise any suitable computer memory such as, for example, dynamic random access memory or a non-volatile memory. A removable storage device, such as for example a CF card, SD card, a disc based device, or the like may further or alternatively be used to store data.

In illustrative examples, mobile device 10 may include a plurality of image sensors 40. Image sensors 40 may include any component suitable for capturing digital image data, such as for example, a charge coupled device (CCD), complementary metal oxide semiconductor (CMOS), and the like. Generally, images sensors 40 may be used to record images of a surface which may be analyzed by the processor 20 to determine one or more characteristics of the surface such as, for example, surface texture. In one example, image sensors 40 may, for a predetermined period, continuously or periodically record images and/or image data, hereinafter referred to as a set of captured images, which may be received by the processor 20 and stored to data storage 30.

In various examples, the image sensors 40 may be positioned on an exterior surface of the housing 15. In one example, a plurality of image sensors 40 may be positioned at one or more angles with respect to one another. In other examples, a plurality of image sensors 40 may be continuously positioned along a curved surface of the housing 15. Alternatively, any suitable arrangement of the image sensors 40 may be employed.

In some examples, the mobile device 10 may include one or more illumination source components 50. Illumination source component 50 may include any suitable illuminating device such as, for example, a light emitting diode (LED). Generally, illumination source components 50 may be positioned on the housing 15 relative to the image sensors 40 such that sufficient illumination may be provided for image sensors 40. In some examples, illumination source components 50 may provide illumination during some or all of the time at which image data is being recorded via image sensors 40 and/or stored to data storage 30.

In some examples, the mobile device 10 may include a communication port 70, such as a universal serial bus (USB) port, or any other suitable communication port including those configured for wireless communication, so that the mobile device 10 may be communicatively linked to a second electronic device, such as a computer, or other suitable electronic device. The communication port 70 may be used to facilitate transferring, downloading, uploading, interacting, etc. between the mobile device 10 and a second electronic device. In some examples, a second electronic device may comprise an external processor 80. The external processor 80 can be any computer or processor known to those skilled in the art, including standard attachments and components thereof (e.g., a disk drive, hard drive, CD player or network server that communicates with a central processing unit (CPU) and main memory, a sound board, a keyboard, a mouse, a monitor, and/or other components).

In illustrative examples, the mobile device 10 may include a power source 60. In one embodiment, the power source may be replaceable and/or rechargeable. In a further example, the power source 60 may be one or more batteries. In other examples, the power source 60 may be an external power source such as, for example, power received via a USB port, wall-power port, or the like.

In some examples, a texture modeling system 100 may be implemented in any computing and/or processing environments, including but not limited to computer software, firmware, device driver, digital electronic circuitry or computer hardware, or any combination of these. In one example, the texture modeling system 100 may comprise a set of instructions running on the processor 20. Generally, the texture modeling system 100 may analyze captured images received from the image sensors 40 to determine one or more characteristics of the surface such as, for example, surface texture. In one example, the texture modeling system 100 may determine a surface texture type such as, for example, rough, smooth, bumpy, jagged, slick, scratchy, silky, soft, prickly, and the like. The texture modeling system 100 is used to illustrate a generic texture modeling system. It is to be appreciated than any of the texture modeling systems hereinafter described may be used for the texture modeling system 100.

While the mobile device 10 is described with respect to an example wherein the central processor 20 and texture modeling system 100 are separate from the external processor 80, it is to be appreciated that either or both of the central processor 20 and texture modeling system 100 may, alternatively, be part of the external processor 80.

Figure 2:
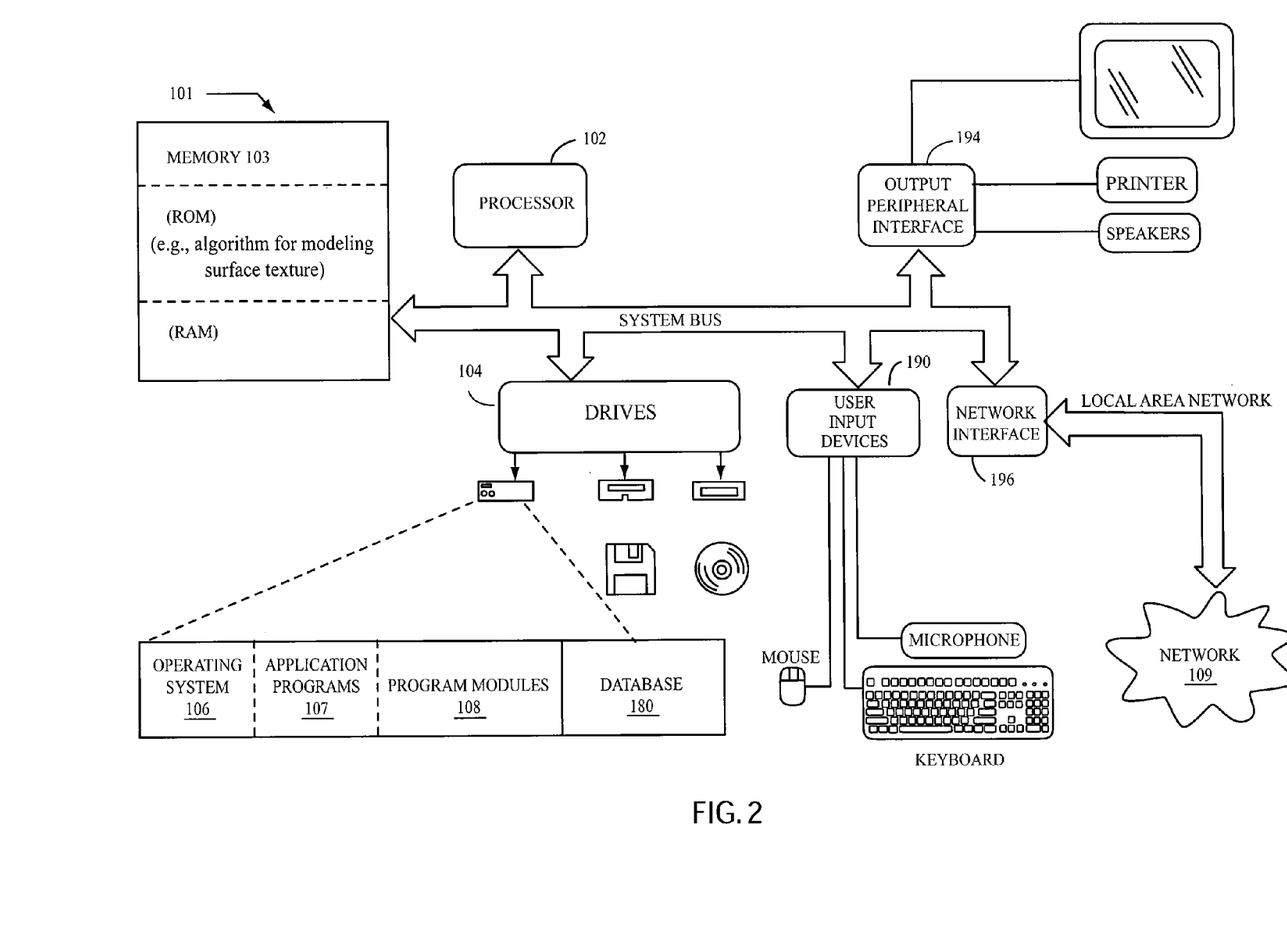
FIG. 2 depicts a suitable computing system environment for implementing examples of the present disclosure.

With reference to FIG. 2, depicted is a suitable computing system environment for implementing examples of the present disclosure. The computing system of FIG. 2 includes a computer 101, including a central processing unit (CPU), also referred to as a processor, 102, main memory 103 and one or more bulk storage devices 104. The processor 102 can generally be of any desired configuration including but not limited to a microprocessor (µP), a microcontroller (µC), a digital signal processor (DSP), or any combination thereof. Thus, each processor 102 can include logic for executing program instructions as well as other functional blocks such as an arithmetic logic unit (ALU), a floating point unit (FPU), a digital signal processing (DSP) core, registers, accumulators, etc. The main memory 103, which may be any suitable form of memory including, but not limited to, volatile memory such as random access memory (RAM), non-volatile memory such as read only memory (ROM) and flash memory storage, data storage devices such as magnetic disk storage (e.g., hard disk drive or HDD), tape storage, optical storage (e.g., compact disk or CD, digital versatile disk or DVD), or other machine-readable storage mediums that can be removable, non-removable, volatile or non-volatile. An algorithm for modeling surface texture may be provided in the memory 103 such as, for example, in the ROM.

The bulk storage devices 104 and their associated computer storage media may be configured to provide storage of computer readable instructions, data structures, program modules and other data for the computer 101. The bulk storage devices 104 may also include an operating system 106, application programs 107, program modules 108, and a database 180. The computer 101 further includes user input devices 190 through which a user may enter commands and data. Example input devices 190 may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to the processor 102 through a user input interface that is coupled to a system bus, but may be coupled by other interface and bus structures, such as a parallel port, game port or a universal serial bus (USB). Computers such as computer 101 may also include other peripheral output devices such as speakers, which may be connected through an output peripheral interface 194 or the like.

The computer 101 may operate in a networked environment using logical connections to one or more computers, such as a remote computer connected to network interface 196. The remote computer may be a personal computer, a server, a router, a network PC, a peer device or other common network node, and can include many or all of the elements described above relative to computer 101. The remote computer may be considered the other of the client or the server depending on the designation of the computer 101. Networking environments are commonplace in offices, enterprise-wide area networks (WAN), local area networks (LAN), intranets and the Internet. Source and destination machines need not be connected by a network 109 or any other means, but instead, data may be migrated via any media capable of being written by the source platform and read by the destination platform or platforms. When used in a LAN or WLAN networking environment, the computer 101 may be coupled to the LAN through a network interface 196 or an adapter. When used in a WAN networking environment, computer 101 may include a modem or other means for establishing communications over the WAN, such as the Internet or network 109. It will be appreciated that other means of establishing a communications link between the computers may be used.

In some examples, the texture modeling system 100 may analyze captured images of a surface to determine one or more variables associated with the captured images, hereinafter referred to as surface variables. In one example, the texture modeling system may analyze one or more sets of captured images to determine one or more surface variables. Surface variables may include any or all of the frequency of vertical displacement in a first dimension and a second dimension (e.g., x and y dimensions), amplitude of displacement in a third dimension (e.g., z dimension), and sharpness, which may be extracted from a wave frequency spectrum. Alternatively, surface variables may include any or all of a frequency of vertical displacement in a first dimension and a second dimension, and an amplitude of displacement in the first or second dimension. In a further alternative, any measurable variables may be determined from the captured images.

As an initial matter, in one example, data relating to one or more known textures, hereinafter referred to as reference texture data, may be stored to the data storage 30. Generally, reference texture data may include data corresponding to a plurality of known textures such as, for example, rough, smooth, bumpy, jagged, slick, scratchy, silky, soft, prickly, and the like. In some examples, the one or more surface values may be converted to numeric values. Algorithms may be used to convert a plurality of such values to a single aggregated numeric value. In alternative examples, more than one aggregated numeric value may be developed using such algorithms. Reference texture data may be similarly associated with a numeric value. The reference numeric values may be grouped into ranges associated with known reference texture types. The aggregated numeric value can be correlated to such reference numeric values to indicate a texture type. In one example, reference numeric values may be grouped into ranges based on characteristics of reference textures that can be sensed visually and or tactilely. The reference numeric value ranges may be discrete or overlapping.

Figure 3:
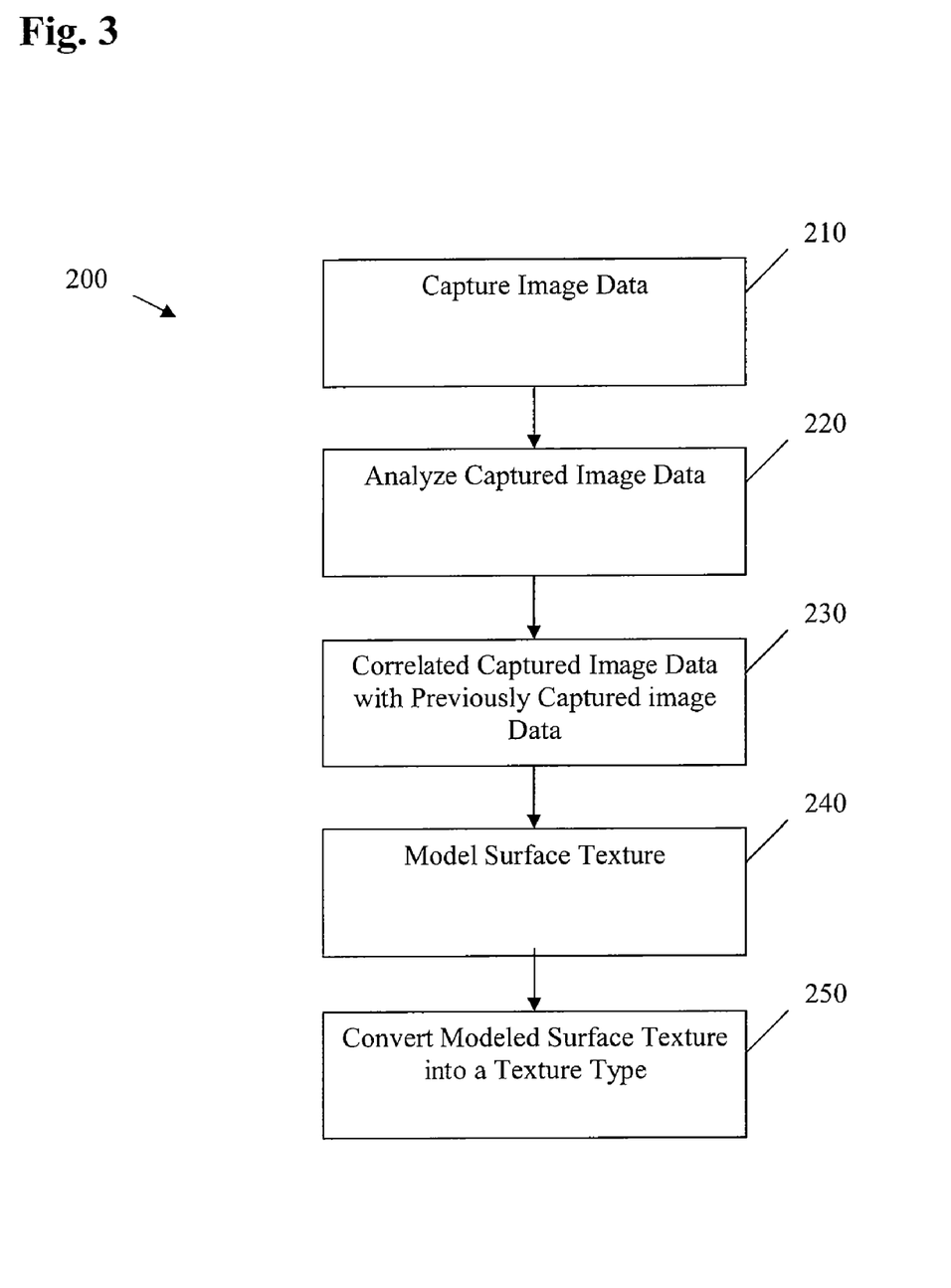
FIG. 3 depicts a process flow diagram of operation of a texture modeling system in accordance with some examples of the present disclosure.

FIG. 3 depicts a process flow diagram of operation of a texture modeling system 200 in accordance with some examples of the present disclosure. The system may be implemented, for example, in the mobile device 10 and/or the external processor 80 described above with respect to FIG. 1. Generally, the texture modeling system 200 may be employed to determine one or more characteristics of a surface of a physical object such as, for example, a type of surface texture.

In some examples, images and/or image data of a surface may be recorded via image sensors 40 (block 210). In one example, the sensors 40 may record images of the surface continuously to generate a set of captured images. Next, the set of captured images may be analyzed (block 220). In one example, the set of captured images may be analyzed to determine one or more surface variables. For example, surface variables may include any or all of the frequency of vertical displacement in a first dimension and a second dimension (e.g., x and y dimensions), amplitude of displacement in a third direction (e.g., z dimension), and sharpness, which may be extracted from wave frequency. In some examples, the one or more surface values may be converted to numeric values. Algorithms may be used to convert a plurality of such values to a single quantified numeric value. In alternative examples, more than one measure numeric value may be developed using such algorithms. This may be a vector consisting of a predetermined number of numerical values.

In various examples, at least a portion of the set of captured images may then be correlated with at least a portion of a previous set of captured images for the surface (block 230). Correlation of the set of captured images data with a previous set of captured images may be used to measure displacement of the mobile device 10 throughout the texture modeling process and/or otherwise be used to model the texture of the surface. In one example, after correlating a set of captured images with a previous set of captured images, the process may return to the step of block 210 to record additional images (e.g., record another set of images).

In illustrative examples, a texture of the surface may then be modeled based on the one or more surface variables (block 240). Finally, the modeled surface texture may be converted into a type of surface texture (block 250). Types of surface textures may include, for example, rough, smooth, bumpy, jagged, slick, scratchy, silky, soft, prickly, and the like. In one example, the modeled surface texture may be converted into a type of surface texture based on a comparison with the reference texture data. For example, the modeled surface texture may be compared with the reference texture data to determine a known surface texture type that is most similar to the modeled surface texture. In a particular example, as discussed above, the aggregated numeric values may be correlated with reference numeric values to indicate/identify a texture type. This correlation may include determining the minimum Euclidean distance between a vector representing a measured texture and reference vectors representing reference textures. Alternatively, any suitable method of correlation may be employed. In one example, a texture of the surface may be modeled without correlating the set of captured images with a previous set of captured images (i.e., the step of block 230 is skipped). In further examples, the determined surface texture type may be useful to a subsequent process.

Figure 4:
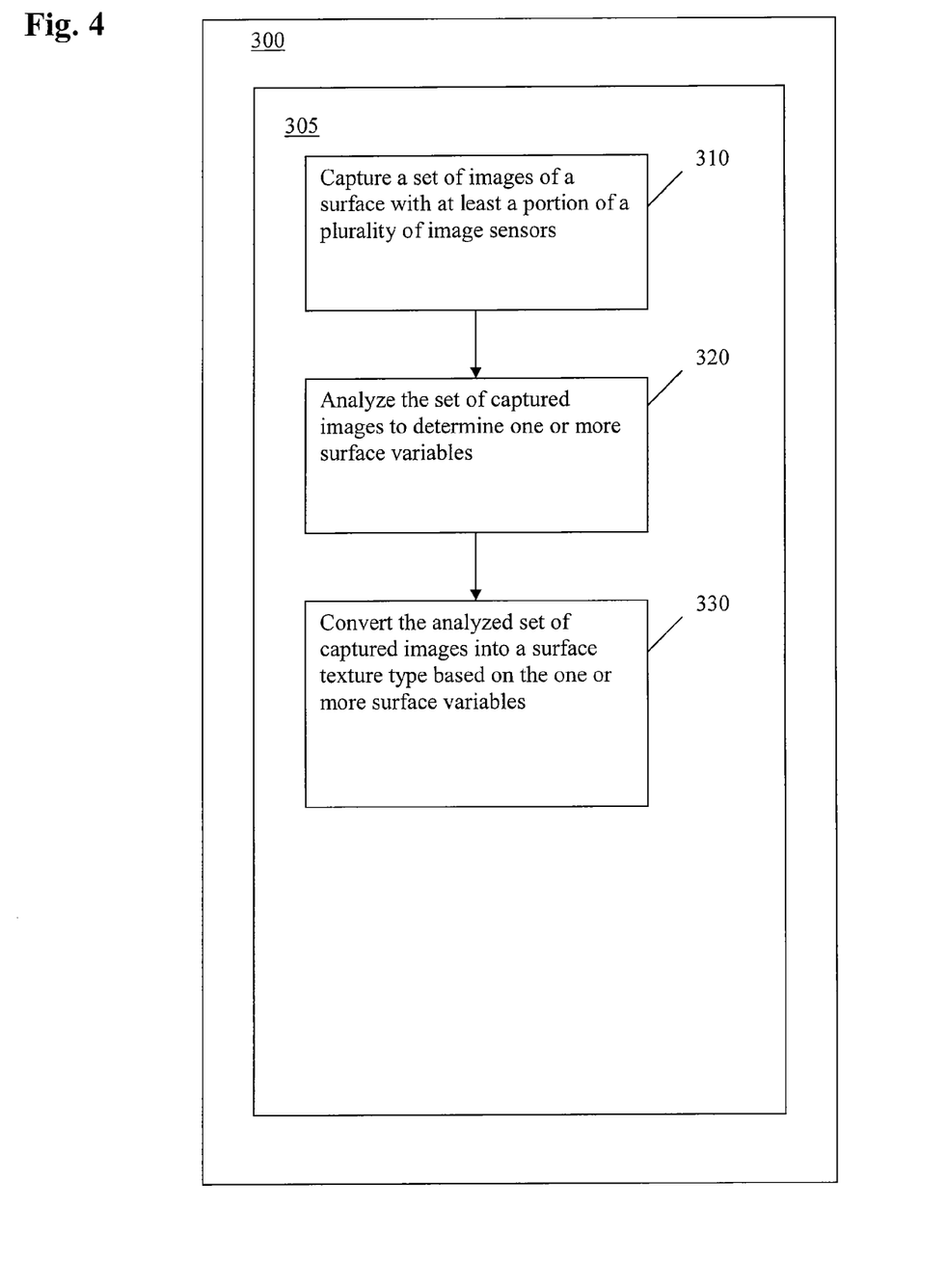
FIG. 4 depicts a schematic of a computer system configured for performing an embodiment of a method for modeling a surface texture in accordance with the present disclosure.

In one particular example, as shown in the schematic of FIG. 4, a computer system 300 may include a processor 305 configured for performing an embodiment of a method for modeling a surface texture in accordance with the present disclosure. In other examples, various steps or portions of various steps of the method may be performed outside of the processor 305. In various examples, the method may capture a set of images of a surface with at least a portion of the plurality of image sensors 40 (block 310). The method may then analyze the set of captured images to determine one or more surface variables (block 320). Finally, the method may convert the analyzed set of captured images into a surface texture type based on the one or more surface variables (block 330).

Figure 5:
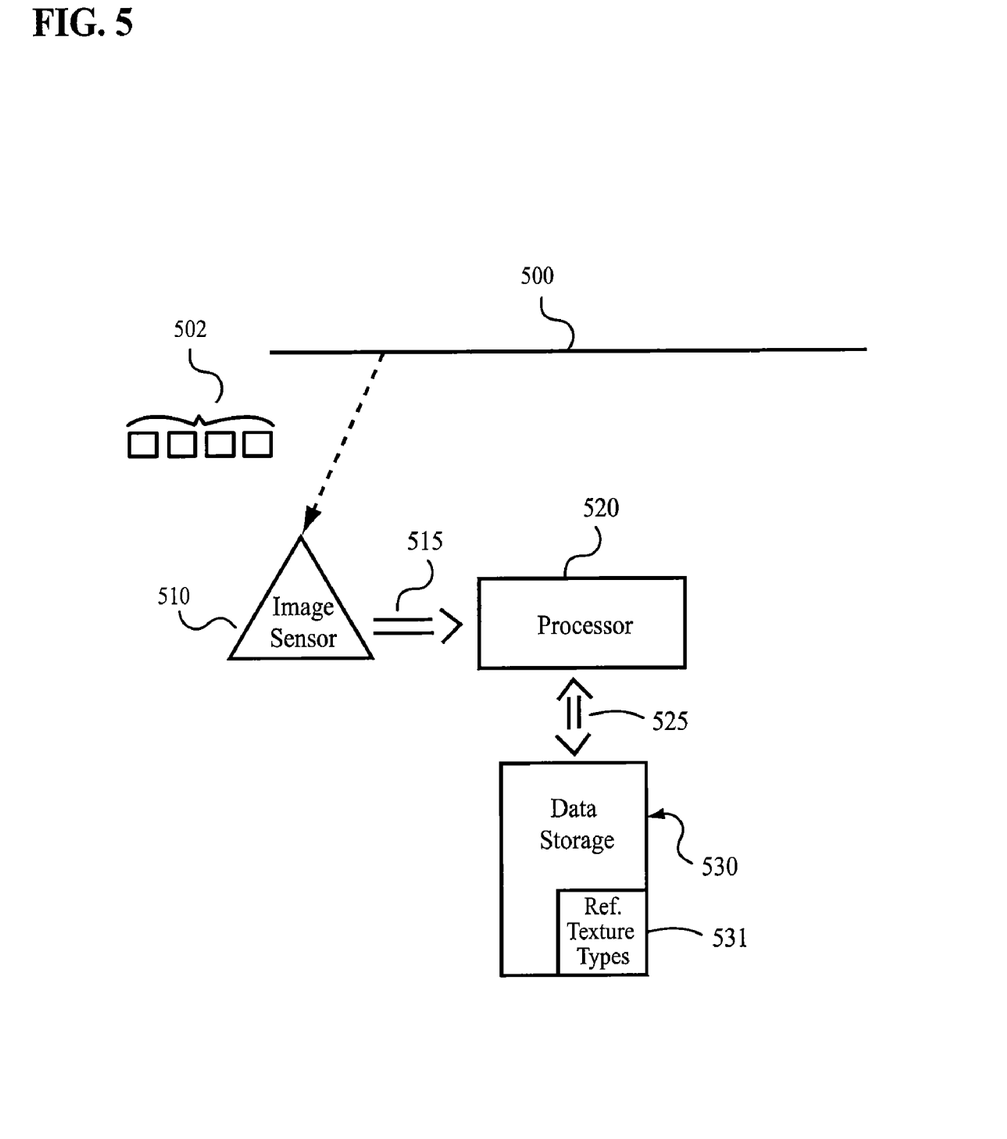
FIG. 5 depicts a schematic diagram of a texture modeling system in accordance with one example of the present disclosure.

FIG. 5 depicts a schematic diagram of a texture modeling system in accordance with one example of the present disclosure. As shown, an image sensor 510 may capture a set of images 502 of a surface 500. FIG. 5 illustrates a set of four images 502 but it is to be appreciated that any number of images 502 may be captured. The set of captured images may be transferred to a processor 520 via a data bus 515. The processor 520 may analyze the set of captured images to determine one or more surface variables. The processor 520, with possible use of information from data storage 530 via a data bus or memory bus 525, may also convert the set of captured images into a surface texture type based on the one or more surface variables. The processor 520 may, in some examples, use logic or algorithms such as those used in 3D modeling technology and reference texture types 531 stored in the data storage 530 for converting the set of captured images into a surface texture type. It is to be appreciated that any or all of the elements described with respect to FIG. 5 may or may not relate to the same elements discussed with respect to previous examples.

The foregoing describes various examples of systems and methods of modeling surface textures. Following are specific examples of systems and methods of modeling surface textures. These are for illustration only and are not intended to be limiting.

The present disclosure generally relates to devices for modeling textures. The described devices typically include a plurality of image sensors, a data storage, and a processor operatively associated with the data storage and adapted to execute computer implemented instructions to capture a set of images of a surface with the image sensors, analyze the set of captured images to determine one or more surface variables, and convert the analyzed set of captured images into a surface texture type based on the one or more surface variables. In some described examples, one or more surface variables may include a frequency of vertical displacement in a first dimension and a second dimension, an amplitude of displacement in a third direction, and sharpness. In other described examples, the processor may be further adapted to execute computer implemented instructions to correlate at least a portion of the set of captured images with at least a portion of a previous set of captured images of the surface. In various described examples, analyzing the set of captured images to determine one or more surface variables and converting the analyzed set of captured images into a surface texture type may include modeling a texture of the surface based on the one or more surface variables and converting the modeled texture into a surface texture type. In further described examples, reference texture data may be stored to the data storage and the modeled surface texture may be converted into a type of surface texture based on a comparison with the reference texture data. In some described examples, the modeled surface texture may be compared with the reference texture data to determine a known surface texture type that is most similar to the modeled surface texture. In additional described examples, the device may further include a housing, wherein the housing is configured such that the texture modeling device is a handheld device. In another embodiment, the plurality of image sensors may be positioned continuously on a curved surface of the housing. In various described examples, the plurality of image sensors are positioned on the housing at one or more angles with respect to one another.

The present disclosure also generally relates to handheld texture modeling devices. In some described examples, the handheld texture modeling devices may include a plurality of image sensors, a data storage, and a processor operatively associated with the data storage and adapted to execute computer implemented instructions to capture a set of images of a surface with the image sensors, analyze the set of captured images to determine one or more surface variables, and convert the analyzed set of captured images into a surface texture type based on the one or more surface variables.

The present disclosure further generally relates to methods for modeling a surface texture using a hand-held device including a housing and a plurality of image sensors. In some described examples, the methods may include capturing a set of images of a surface with the image sensors, analyzing the set of captured images to determine one or more surface variables, and converting the analyzed set of captured images into a surface texture type based on the one or more surface variables. In additional examples, the one or more surface variables include a frequency of vertical displacement in a first dimension and a second dimension, an amplitude of displacement in a third direction, and sharpness. In further examples, the method may include correlating at least a portion of the set of captured images with at least a portion of a previous set of captured images of the surface. In other examples, analyzing the set of captured images to determine one or more surface variables and converting the analyzed set of captured images into a surface texture type may include modeling a texture of the surface based on the one or more surface variables, and converting the modeled texture into a surface texture type. In some examples, reference texture data may be stored to the data storage and the modeled surface texture may be converted into a type of surface texture based on a comparison with the reference texture data. In additional examples, the modeled surface texture may be compared with the reference texture data to determine a known surface texture type that is most similar to the modeled surface texture. In further examples, the plurality of image sensors may be positioned continuously on a curved surface of the housing. In other examples, the plurality of image sensors may be positioned on the housing at one or more angles with respect to one another.

The present disclosure further generally relates to digital storage media having code provided thereon for programming one or more processors to perform procedures for modeling a surface texture using a device including a housing and a plurality of image sensors. In some examples, the procedures may include capturing a set of images of a surface with the image sensors, analyzing the set of captured images to determine one or more surface variables, and converting the analyzed set of captured images into a surface texture type based on the one or more surface variables. In additional examples, the one or more surface variables include a frequency of vertical displacement in a first dimension and a second dimension, an amplitude of displacement in a third direction, and sharpness. In further examples, the procedure may also include correlating at least a portion of the set of captured images with at least a portion of a previous set of captured images of the surface. In other examples, analyzing the set of captured images to determine one or more surface variables and converting the analyzed set of captured images into a surface texture type may include modeling a texture of the surface based on the one or more surface variables, and converting the modeled texture into a surface texture type. In various examples, reference texture data may be stored to the data storage, and the modeled surface texture may be converted into a type of surface texture based on a comparison with the reference texture data. In some examples, the modeled surface texture is compared with the reference texture data to determine a known surface texture type that is most similar to the modeled surface texture. In additional examples, the plurality of image sensors may be positioned continuously on a curved surface of the housing.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for modeling a texture associated with a surface, comprising:
    a plurality of image sensors; and
    a processor adapted to execute computer implemented instructions to:
        capture a set of images of the surface with one or more of the plurality of image sensors;
        analyze the set of captured images to determine one or more surface variables, the one or more surface variables comprising a frequency of vertical displacement in a first dimension and a second dimension; and
        convert the analyzed set of captured images into a surface texture type based on the one or more surface variables.

2. The device of claim 1, the one or more surface variables further comprising an amplitude of displacement in a third dimension and sharpness.

3. The device of claim 1, the one or more surface variables further comprising an amplitude of displacement in the first or second dimension.

4. The device of claim 1, wherein the processor is further adapted to execute computer implemented instructions to correlate at least a portion of the set of captured images with at least a portion of a previous set of captured images of the surface.

5. The device of claim 1, wherein analyzing the set of captured images to determine one or more surface variables and converting the analyzed set of captured images into a surface texture type comprises:
    modeling a texture of the surface based on the one or more surface variables; and
    converting the modeled texture into a surface texture type.

6. The device of claim 5:
    wherein reference texture data is accessible to the processor; and
    wherein the modeled surface texture is converted into a type of surface texture based on a comparison with the reference texture data.

7. The device of claim 6, wherein the modeled surface texture is compared with the reference texture data to determine a known surface texture type that is most similar to the modeled surface texture.

8. The device of claim 1, further comprising a housing, wherein the housing is configured such that the texture modeling device is a handheld device.

9. The device of claim 7, wherein the plurality of image sensors are positioned on the housing at angles with respect to one another.

10. A method for modeling a texture of a surface using a hand-held device that includes a housing and a plurality of image sensors, the method comprising:
    capturing a set of images of the surface with at least a portion of the plurality of image sensors;
    analyzing the set of captured images to determine one or more surface variables, the one or more surface variables comprising a frequency of vertical displacement in a first dimension and a second dimension; and
    converting the analyzed set of captured images into a surface texture type based on the one or more surface variables.

11. The method of claim 10, the one or more surface variables further comprising an amplitude of displacement in a third dimension and sharpness.

12. The method of claim 10, further comprising correlating at least a portion of the set of captured images with at least a portion of a previous set of captured images of the surface.

13. The method of claim 10, wherein analyzing the set of captured images to determine one or more surface variables and converting the analyzed set of captured images into a surface texture type comprises:
    modeling a texture of the surface based on the one or more surface variables; and
    converting the modeled texture into a surface texture type.

14. The method of claim 13, wherein reference texture data is stored to data storage; and wherein the modeled surface texture is converted into a type of surface texture based on a comparison with the reference texture data.

15. The method of claim 14, wherein the modeled surface texture is compared with the reference texture data to determine a known surface texture type that is most similar to the modeled surface texture.

16. Digital storage media having code provided thereon for programming one or more processors to perform a procedure for modeling a surface texture using a device comprising a housing and a plurality of image sensors, wherein the procedure comprises:
- capturing a set of images of the surface with one or more of the plurality of image sensors;
- analyzing the set of captured images to determine one or more surface variables, the one or more surface variables comprising a frequency of vertical displacement in a first dimension and a second dimension; and
- converting the analyzed set of captured images into a surface texture type based on the one or more surface variables.

17. The digital storage media of claim 16, the one or more surface variables further comprising an amplitude of displacement in a third dimension and sharpness.

18. The digital storage media of claim 16, wherein analyzing the set of captured images to determine one or more surface variables and converting the analyzed set of captured images into a surface texture type comprises:
- modeling a texture of the surface based on the one or more surface variables; and
- converting the modeled texture into a surface texture type.

19. The digital storage media of claim 18, wherein reference texture data is stored to data storage; and wherein the modeled surface texture is converted into a type of surface texture based on a comparison with the reference texture data.

20. The digital storage media of claim 19, wherein the modeled surface texture is compared with the reference texture data to determine a known surface texture type that is most similar to the modeled surface texture.

* * * * *

UNITED STATES PATENT AND TRADEMARK OFFICE
CERTIFICATE OF CORRECTION

| | | |
|---|---|---|
| PATENT NO. | : 8,355,541 B2 | |
| APPLICATION NO. | : 12/502304 | |
| DATED | : January 15, 2013 | |
| INVENTOR(S) | : Wolfe et al. | |

It is certified that error appears in the above-identified patent and that said Letters Patent is hereby corrected as shown below:

In the Drawings:

In Fig. 2, Sheet 2 of 5, for Tag "104", delete "BULK STORAGE DRIVES" and insert -- BULK STORAGE DEVICES --, therefor.

In the Claims:

In Column 10, Line 66, in Claim 16, delete "Digital" and insert -- A digital --, therefor.

Signed and Sealed this
Twenty-third Day of April, 2013

Teresa Stanek Rea
*Acting Director of the United States Patent and Trademark Office*